United States Patent
Kitani et al.

(10) Patent No.: US 8,233,383 B2
(45) Date of Patent: Jul. 31, 2012

(54) NETWORK RELAY SYSTEM AND CONTROL METHOD THEREOF

(75) Inventors: Makoto Kitani, Atsugi (JP); Tatsuya Watanuki, Ebina (JP); Keiichiro Yamate, Hadano (JP); Atsushi Kimoto, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/210,556

(22) Filed: Sep. 15, 2008

(65) Prior Publication Data
US 2009/0019130 A1 Jan. 15, 2009

Related U.S. Application Data

(63) Continuation of application No. 10/867,212, filed on Jun. 15, 2004, now abandoned.

(30) Foreign Application Priority Data

Jun. 10, 2004 (JP) ................................. 2004-172451

(51) Int. Cl.
*G06F 11/00* (2006.01)
(52) U.S. Cl. .................. 370/220; 370/242; 714/4.11
(58) Field of Classification Search .................. 370/216, 370/217, 219, 220, 242; 714/1, 2, 4.11
See application file for complete search history.

(56) References Cited

U.S. PATENT DOCUMENTS

| | | | | |
|---|---|---|---|---|
| 5,473,599 | A * | 12/1995 | Li et al. | 370/219 |
| 7,209,435 | B1 * | 4/2007 | Kuo et al. | 370/219 |
| 2005/0198247 | A1 * | 9/2005 | Perry et al. | 709/223 |

FOREIGN PATENT DOCUMENTS

| | | |
|---|---|---|
| JP | 2003-134002 | 5/2003 |
| JP | 2003-244192 | 8/2003 |
| JP | 2003-258829 | 9/2003 |

* cited by examiner

*Primary Examiner* — Nittaya Juntima
*Assistant Examiner* — Mon Cheri Davenport
(74) *Attorney, Agent, or Firm* — McDermott Will & Emery LLP

(57) ABSTRACT

The network relay device of the invention makes a pair with at least a specific network device to relay data in a network. The network relay device includes: a control module that sends and receives a control frame signal to and from the specific network device, selects either of a master mode and a backup mode based on at least the control frame signal sent from the specific network device, and changes a working state according to a result of the selection; and a communication module that is under control of the control module to open a port and enable data transmission via a line linked to the port in the case of setting a master state to the working state, and to block off the port and disconnect the line linked to the port in the case of setting a backup state or another non-master state to the working state. The control module changes the working state from the backup state to a first intermediate state in response to selection of the master mode, determines whether the specific network device is in the backup state, based on the control frame signal sent from the specific network device, and changes the working state from the first intermediate state to the master state after confirmation that the specific network is in the backup state.

7 Claims, 8 Drawing Sheets

NETWORK RELAY SYSTEM AND CONTROL METHOD THEREOF

RELATED APPLICATIONS

This application is a Continuation of U.S. application Ser. No. 10/867,212, filed Jun. 15, 2004, claiming priority of Japanese Application No. 2004-172451, filed Jun. 10, 2004, the entire contents of each of which are hereby incorporated by reference.

BACKGROUND OF THE INVENTION

1. Field of the Invention

The present invention relates to a network relay device that relays data in a network.

2. Description of the Related Art

The network generally adopts the redundant structure, in order to prevent the shutdown of the entire network due to the occurrence of some trouble or failure in a line or a device included in the network.

A layer 2 (data link layer) and a layer 3 (network layer) in the OSI reference model have different network characteristics. In the case of an internet protocol (IP) as a typical example of the layer 3, simple connection of two devices by a physical line does not establish intercommunication between the connected devices unless IP addresses are set in the respective devices. In the case of Ethernet (registered trademark) as a typical example of the layer 2, on the other hand, simple connection of two devices by a physical line establishes intercommunication between the connected devices.

An L2 switch is one example of layer 2 (L2)-compliant network relay devices. Interconnection of multiple L2 switches by two or a greater number of physical lines or establishment of the redundant structure by multiple L2 switches undesirably causes a loop in the network as shown in FIG. 7. In the illustration of FIG. 7, SW represents an L2 switch.

The occurrence of the loop in the network may lead to a significant problem. In the process of transmission of packets via the Ethernet (registered trademark), for example, in the case of an unknown destination (MAC address) of the packets, the L2 switch uses a broadcast address and sends broadcast packets. The L2 switch sends the broadcast packets to a line other than the packet-receiving line and does not memorize the packets transmitted previously. In the presence of a loop in the network, the broadcast packets infinitely multiply and endlessly circulate in the loop. This applies significant loading to the packet transfer of the L2 switch and affects other networks to occupy the available bandwidth.

A known measure against this potential problem divides the multiple lines and multiple L2 switches constituting the loop into an active system and a standby system. This technique blocks off the packet transfer from the L2 switches in the standby system and disconnects the lines in the standby system, while establishing communication only by the L2 switches and the lines in the active system. This prevents the occurrence of a loop in the network.

In the case of virtual LANs (VLANs), setting of the active system or the standby system is carried out with regard to each group of a single or multiple virtual LANs. Namely the L2 switches and the lines working as the active system in one group may be specified as the standby system in another group, and vice versa.

A prior art system may use a pair of the L2 switches, which are interlocked to effect a switchover between a master mode and a backup mode as shown in FIG. 8. This structure enables a smooth switchover from the active system to the standby system, in the event of any trouble or failure arising in the current active system.

In the system using the paired L2 switches, one of the L2 switches is set to the master L2 switch and is used in the active system, whereas the other of the L2 switches is set to the backup L2 switch and is used in the standby system. The master L2 switch opens a port to establish communication via a line linked to the port, while the backup L2 switch blocks off the port to disconnect the line linked to the port. During operations, the master L2 switch and the backup L2 switch send and receive the control frame signals to and from each other at regular intervals for mutual confirmation of the effective presence. In the event of any trouble or failure arising in the master L2 switch or in the line connecting with the master L2 switch, the backup L2 switch detects the occurrence of the trouble or failure and takes over the master mode in place of the current master L2 switch to open the blocked port and establish communication via the line linked to the port. This leads to a switchover of the entire network from the active system to the standby system.

The network-related technique described above is disclosed, for example, in U.S. Pat. No. 5,473,599.

As mentioned above, the master L2 switch and the backup L2 switch send and receive the control frame signals to and from each other at regular intervals for mutual confirmation of the effective presence. A control module in each of the L2 switches manages the control frame signals. The control module in the master L2 switch may fall into some busy status. The communication module generally carries out the hardware processing and thus attains normal transfer of packets even in the busy status. The control module in the busy status may, however, fail to send the control frame signal to the backup L2 switch. In response to failed reception of the control frame signal from the master L2 switch, the control module in the backup L2 switch wrongly detects the occurrence of a failure or trouble in the master L2 switch and takes over the master mode in place of the current master L2 switch to open the blocked port and establish communication via the line linked to the port. This causes both the paired L2 switches to work in the master mode and fall into a double master situation. Communication is established individually via the paired L2 switches in the master mode. This undesirably causes a loop in the network.

SUMMARY OF THE INVENTION

The object of the present invention is thus to eliminate the drawbacks of the prior art discussed above and to provide a technique that effectively prevents the double master situation and restrains the occurrence of a loop in a network.

In order to attain at least part of the above and the other related objects, the present invention is directed to a network relay device that makes a pair with at least a specific network device to relay data in a network. The network relay device includes: a control module that sends and receives a control frame signal to and from the specific network device, selects either of a master mode and a backup mode based on at least the control frame signal sent from the specific network device, and changes a working state according to a result of the selection; and a communication module that is under control of the control module to open a port and enable data transmission via a line linked to the port in the case of setting a master state to the working state, and to block off the port and disconnect the line linked to the port in the case of setting a backup state or another non-master state to the working state.

The control module changes the working state from the backup state to a first intermediate state in response to selection of the master mode, determines whether the specific network device is in the backup state, based on the control frame signal sent from the specific network device, and changes the working state from the first intermediate state to the master state after confirmation that the specific network is in the backup state.

The network relay device of the invention does not immediately change the working state from the backup state to the master state in response to selection of the master mode but temporarily changes the working state to the first intermediate state. After confirmation that the specific network device is in the backup state based on the control frame signal sent from the specific network device, the network relay device changes the working state from the first intermediate state to the master state.

The network relay device of the invention changes the working state from the backup state to the master state after confirmation that the working state of the pairing specific network device is in the backup state. This arrangement effectively prevents both the network relay device and the pairing specific network device from being simultaneously set in the master state (double master situation) and thereby restrains the occurrence of a loop in the network.

In one preferable embodiment of the network relay device of the invention, the control module changes the working state from either of the backup state and the first intermediate state to a second intermediate state in the event of failed reception of the control frame signal from the specific network device for a preset time period.

In the case of subsequent resuming reception of the control frame signal from the specific network device, the control module selects either of the master mode and the backup mode and changes the working state from the second intermediate state to the first intermediate state in response to selection of the master mode, while changing the working state from the second intermediate state to the backup state in response to selection of the backup mode.

In the event of failed transmission of the control frame signal from the specific network device that is in some busy status, the control module in the network relay device of the invention changes the working state to the second intermediate state on the condition that the control frame signal has not been received for the preset time period. Namely the network relay device of the invention does not immediately change its working state to the master state. When the specific network device resumes transmission of the control frame signal in response to cancellation of the busy status, the control module in the network relay device of the invention resumes reception of the control frame signal and selects either the master mode or the backup mode. The working state is changed to the first intermediate state in response to selection of the master mode, while being changed to the backup state in response to selection of the backup mode. This arrangement effectively prevents the double master situation.

In the network relay device of the invention having the above arrangement, it is preferable that the control module changes the working state from the second intermediate state to the master state, in response to an externally given transition instruction to the master state.

In the event of failed transmission of the control frame signal due to the occurrence of some trouble or failure in the specific network device, the network relay device of the invention changes the working state to the second intermediate state after elapse of the preset time period. In the case of the occurrence of some trouble or failure, it is expected that failed reception of the control frame signal from the specific network device continues. The working state is directly changed to the master state, in response to input of externally given transition instruction to the master state. The network relay device of the invention thus takes over the master mode in place of the specific network device. This attains a changeover from the active system to the standby system in the network and thereby ensures the redundancy of the network.

In another preferable embodiment of the network relay device of the invention, the network includes a large number of virtual LANs, which are divided into multiple groups. The control module carries out selection of either of the master mode and the backup mode and management of the working state with regard to each of the multiple groups. The communication module under control opens and blocks off the port with regard to each of the multiple groups.

In the network including a large number of virtual LANs, it is preferable to carry out the control and management discussed above with regard to each group of a single or multiple virtual LANs. This arrangement effectively prevents the double master situation and restrains the occurrence of a loop in each virtual LAN.

The technique of the invention is not restricted to the network relay device described above but is also applicable to a control method of such a network relay device. The invention may be actualized by diversity of other applications, for example, computer programs to attain the network relay device and its control method, recording media in which such computer programs are recorded, and data signals that include such computer programs and are embodied in carrier waves.

DESCRIPTION OF THE PREFERRED EMBODIMENTS

Figure 1:
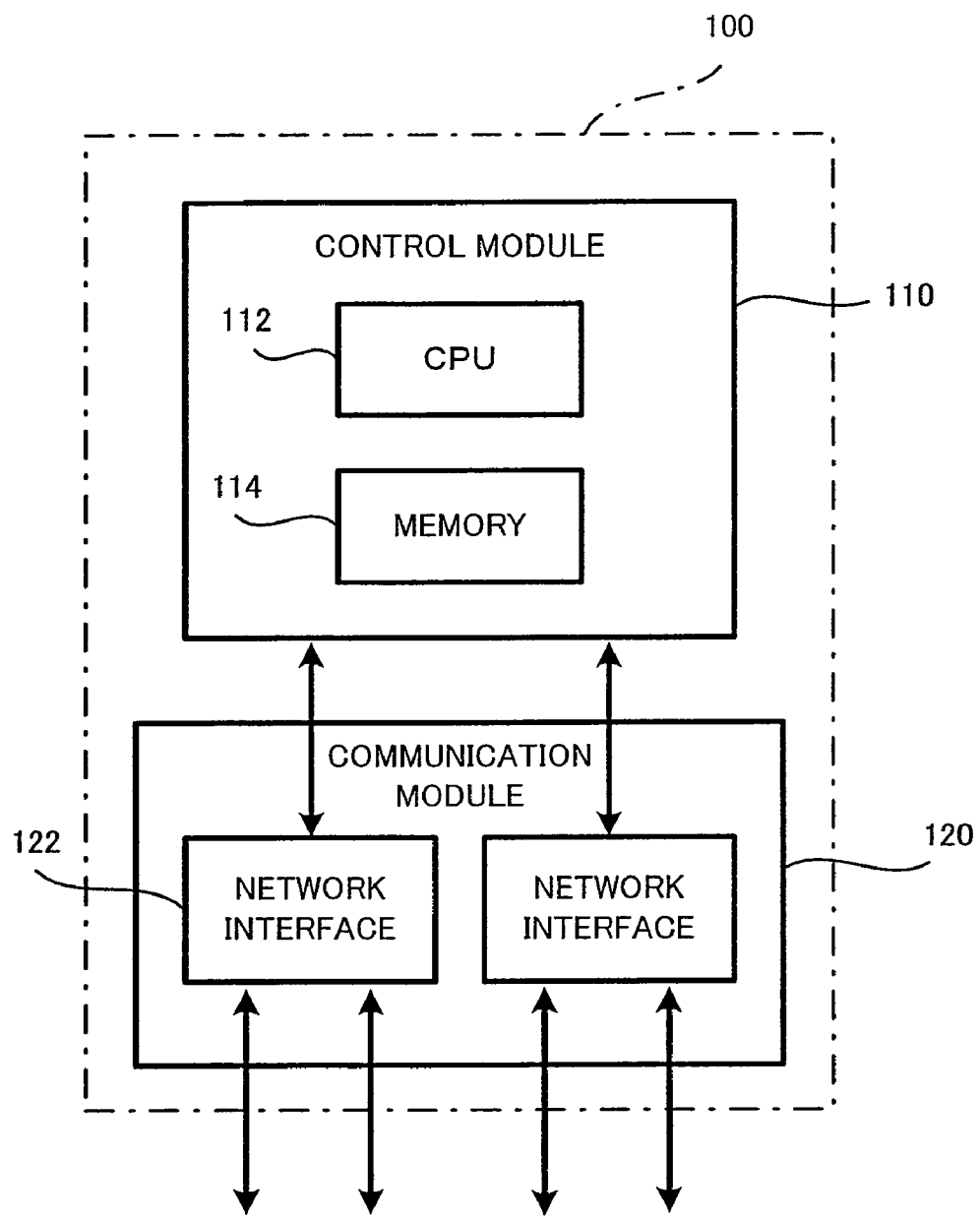
FIG. 1 is a block diagram showing the configuration of an L2 switch 100 in one embodiment of the invention.

One mode of carrying out the invention is discussed below in the following sequence:
A. Configuration of Embodiment
B. Connection
C. Operations of Embodiment
D. Modifications A. Configuration of Embodiment FIG. 1 is a block diagram showing the configuration of an L2 switch 100 in one embodiment of the invention. As shown in FIG. 1, the L2 switch 100 of the embodiment mainly includes a control module 110 and a communication module 120. The control module 110 has a CPU 112 and a memory 114. The CPU 112 executes programs stored in the memory 114 to manage the whole system, process control packets, and send and receive control frame signals. The communication module 120 includes network interfaces 122 and relays packets on a layer 2 (data link layer) of the OSI reference model. The network interfaces 122 are respectively connected to physical lines (for example, twisted pair cables or optical fibers) of Ethernet (registered trademark) or another adequate network via corresponding ports (not shown).

B. Connection

Figure 2:
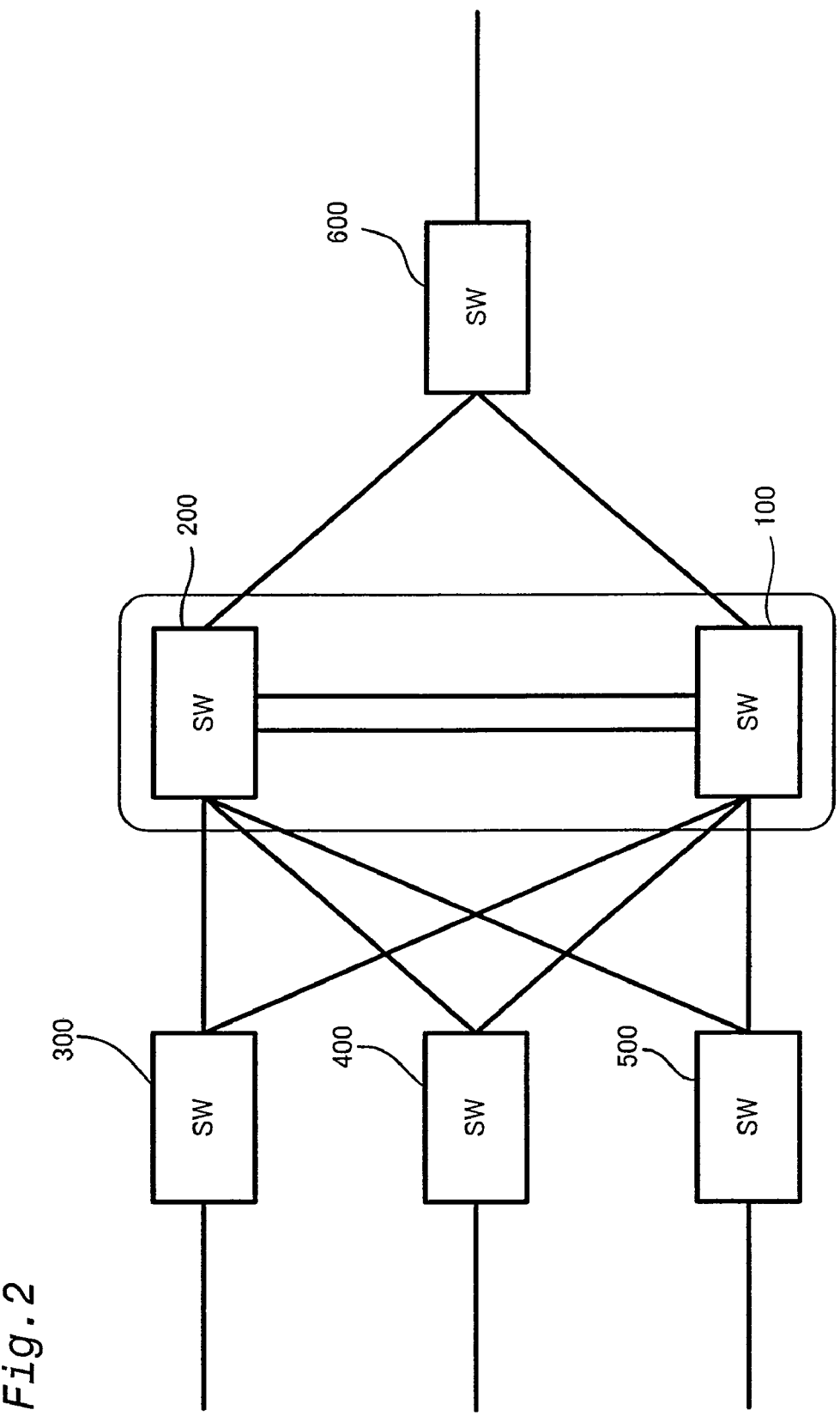
FIG. 2 shows a connection of the L2 switch 100 shown in FIG. 1.

FIG. 2 shows a connection of the L2 switch 100 shown in FIG. 1. The L2 switch 100 of the embodiment and another L2 switch 200 make a pair and are interconnected via physical lines as shown in FIG. 2. The L2 switch 200 has the same configuration as that of the L2 switch 100 shown in FIG. 1.

The paired L2 switches 100 and 200 are individually linked to other four L2 switches 300 through 600 by physical lines. Connection of the L2 switches 100 and 200 with the four other L2 switches ensures the redundancy of the network. Interconnection between the L2 switches 100 and 200 by the two physical lines also ensures the redundancy.

C. Operations of Embodiment

The paired L2 switches 100 and 200 are interlocked to allow for a switchover between a master mode and a backup mode. One of the L2 switches is set to the master L2 switch and is used in the active system, whereas the other of the L2 switches is set to the backup L2 switch and is used in the standby system.

The number of effective ports, the priority value, and the MAC address determine which of the L2 switches 100 and 200 works as the master L2 switch or as the backup L2 switch. The number of effective ports represents the number of communicable ports. The priority value is allocated in advance to each L2 switch.

More specifically the L2 switch having the greater number of effective ports, the higher priority value, and the smaller MAC address works as the master L2 switch. The general procedure sets the order of precedence between the number of effective ports and the priority value. For example, when the preference is given to the number of effective ports over the priority value, the procedure first compares the numbers of effective ports in the two L2 switches, then compares the priority values in the case of identical numbers of effective ports, and further compares the MAC addresses in the case of identical priority values. In another example, when the preference is given to the priority value over the number of effective ports, the procedure first compares the priority values in the two L2 switches, then compares the numbers of effective ports in the case of identical priority values, and further compares the MAC addresses in the case of identical numbers of effective ports.

In the L2 switch 100 of the embodiment, the control module 110 sends and receives control frame signals via the physical lines connecting with the L2 switch 200. The control frame signal includes information on the number of effective ports, the priority value, and the MAC address, in addition to the own working state and the working state of the opposite device.

For example, when the preference is given to the number of effective ports, the control module 110 receives the control frame signal from the L2 switch 200, extracts the number of effective ports from the received control frame signal (that is, the number of effective ports in the L2 switch 200), and compares the own number of effective ports in the L2 switch 100 with the extracted number of effective ports. When the extracted number of effective ports in the L2 switch 200 is greater than the own number of effective ports in the L2 switch 100, the backup mode is selected. When the own number of effective ports in the L2 switch 100 is greater than the extracted number of effective ports in the L2 switch 200, on the other hand, the master mode is selected. In the case of identical numbers of effective ports, the control module 110 subsequently extracts the priority value from the control frame signal (that is, the priority value in the L2 switch 200) and compares the own priority value in the L2 switch 100 with the extracted priority value. When the extracted priority value in the L2 switch 200 is higher than the own priority value in the L2 switch 100, the backup mode is selected. When the own priority value in the L2 switch 100 is higher than the extracted priority value in the L2 switch 200, on the other hand, the master mode is selected. In the case of identical priority values, the control module 110 then extracts the MAC address from the control frame signal (that is, the MAC address in the L2 switch 200) and compares the own MAC address in the L2 switch 100 with the extracted MAC address. When the extracted MAC address in the L2 switch 200 is smaller than the own MAC address in the L2 switch 100, the backup mode is selected. When the own MAC address in the L2 switch 100 is smaller than the extracted MAC address in the L2 switch 200, on the other hand, the master mode is selected.

Figure 3:
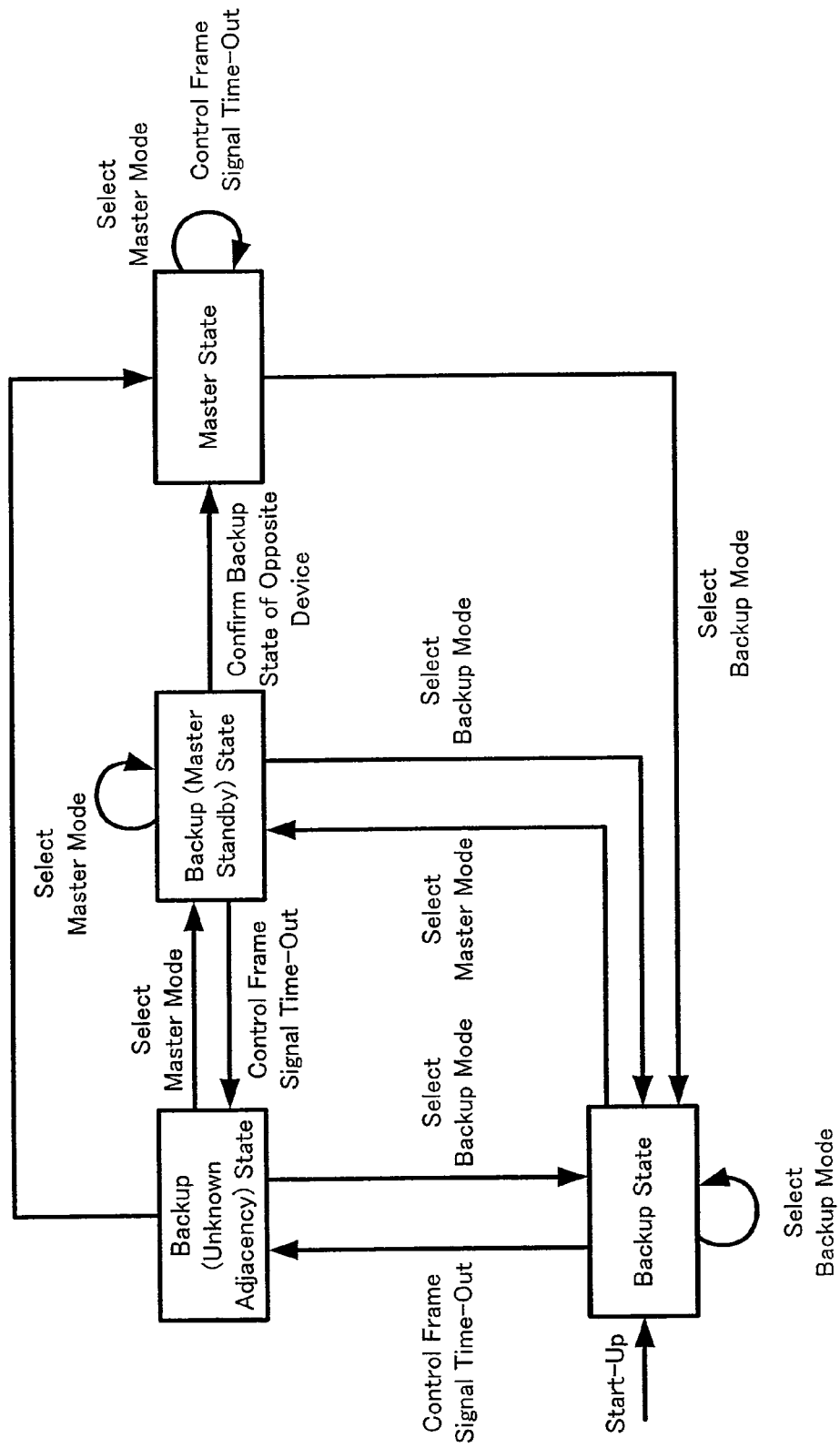
FIG. 3 is a state transition diagram showing a transition of the working state in the L2 switch 100 shown in FIG. 1.

The control module 110 changes the working state as shown in FIG. 3 in response to selection of either the master mode or the backup mode.

FIG. 3 is a state transition diagram showing a transition of the working state in the L2 switch 100 of the embodiment.

The L2 switch 100 takes one of four available states for its working state, that is, 'backup', 'backup (unknown adjacency)', 'backup (master standby)', and 'master', as shown in FIG. 3. The working state changes according to the situation. Here the backup (master standby) state is equivalent to the first intermediate state of the invention, and the backup (unknown adjacency) state is equivalent to the second intermediate state of the invention.

In the system of this embodiment, the transition of the working state of the pairing L2 switch 200, as well as the working state of the L2 switch 100, follows the state transition diagram of FIG. 3.

The L2 switch 100 of the embodiment changes its working state from the startup backup state to the master state by a route discussed below, while sending and receiving the control frame signals to and from the L2 switch 200.

Figure 4:
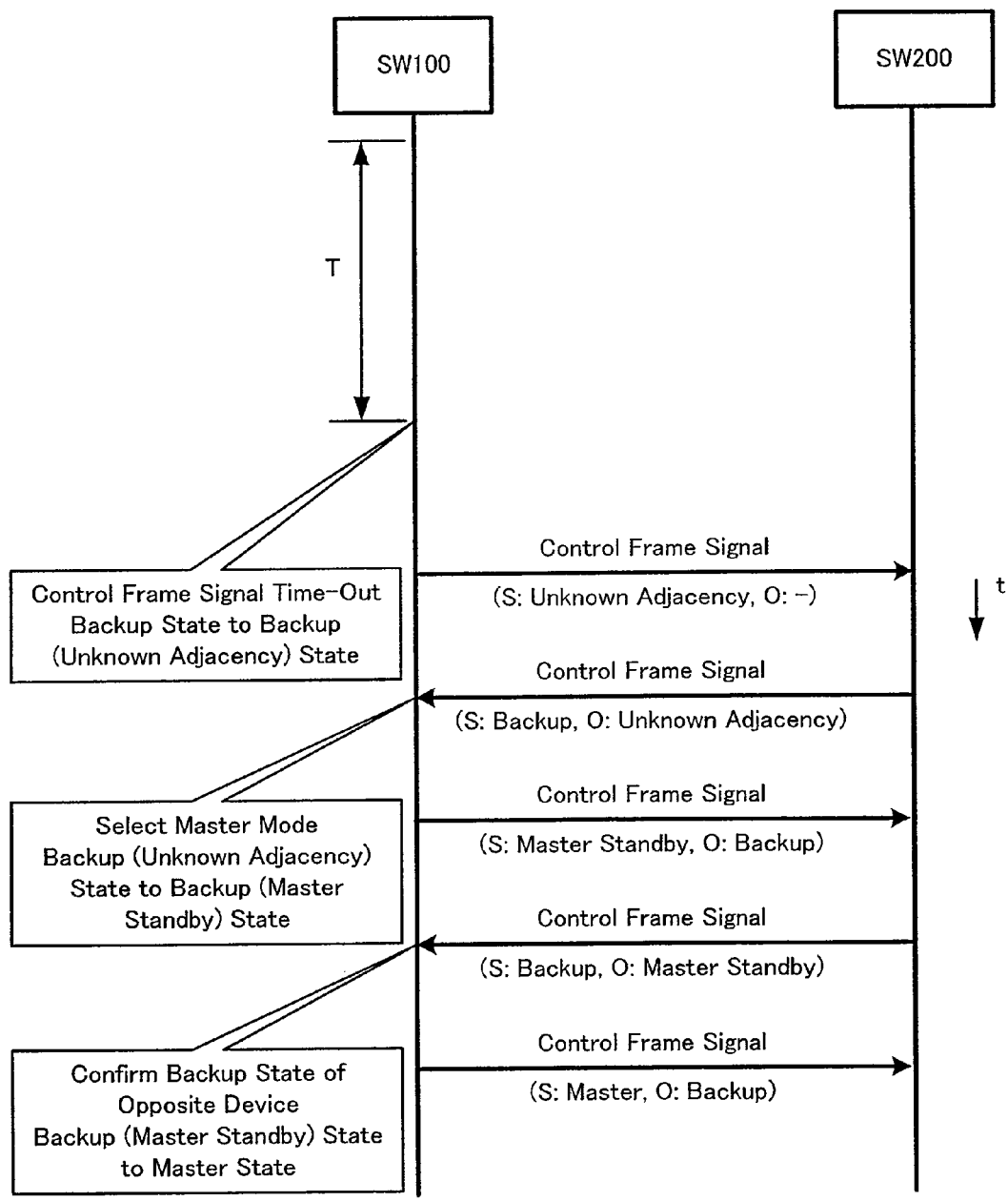
FIG. 4 shows a transition of the working state of the L2 switch 100 on a start-up and transmission of control frame signals.

FIG. 4 shows a transition of the working state of the L2 switch 100 on a start-up and transmission of control frame signals. The control frame signal includes the own working state and the working state of the opposite device as mentioned previously. These workings states are shown in brackets in FIG. 4. The symbol 'S' represents the own working state, and the symbol 'O' represents the working state of the opposite device. The arrow t denotes lapse of time.

On a start-up, the L2 switch 100 is set in the backup state as shown in FIG. 3. At the start-up, no connection has yet been established between the L2 switch 100 and the L2 switch 200. The control module 110 accordingly does not receive the control frame signal from the L2 switch 200 in a preset time period T and changes the working state of the L2 switch 100 to the backup (unknown adjacency) state in response to a control frame signal time-out. The L2 switch 200 similarly changes its working state to the backup (unknown adjacency) state in response to the control frame signal time-out.

On establishment of the connection between the L2 switches 100 and 200, the control module 110 of the L2 switch 100 sends the control frame signal to the L2 switch 200 as shown in FIG. 4. The working state of the L2 switch 100 is currently the backup (unknown adjacency) state, whereas the working state of the opposite device or the L2 switch 200 is unknown. The control module 110 thus sends the control frame signal with an entry of the backup (unknown adjacency) state for the own working state and with no entry for the working state of the opposite device.

The control module of the L2 switch 200 set in the backup (unknown adjacency) state receives the control frame signal from the L2 switch 100 and selects either the master mode or the backup mode, based on the received control frame signal as discussed above. For example, in response to selection of the backup mode, the control module changes the working state of the L2 switch 200 to the backup state as shown in FIG. 3.

The control module of the L2 switch 200 then sends the control frame signal to the L2 switch 100. The working state of the L2 switch 200 has been changed to the backup state, so that the control module of the L2 switch 200 sends the control frame signal with an entry of the backup state for the own working state and with an entry of the backup (unknown adjacency) state for the working state of the opposite device or the L2 switch 100.

The control module 110 of the L2 switch 100 set in the backup (unknown adjacency) state receives the control frame signal from the L2 switch 200 and selects either the master mode or the backup mode, based on the received control frame signal. In this illustrated example, since the L2 switch 200 has already selected the backup mode, the control module 110 of the L2 switch 100 inevitably selects the master mode. The control module 110 then changes the working state of the L2 switch 100 to the backup (master standby) state as shown in FIG. 3.

The control module 110 subsequently sends the control frame signal to the L2 switch 200. The working state of the L2 switch 100 has been changed to the backup (master standby) state, so that the control module 110 of the L2 switch 100 sends the control frame signal with an entry of the backup (master standby) state for the own working state and with an entry of the backup state for the working state of the opposite device or the L2 switch 200.

The control module of the L2 switch 200 set in the backup state receives the control frame signal from the L2 switch 100 and selects either the master mode or the backup mode, based on the received control frame signal. Unless there is any variation in number of effective ports or another affecting piece of information, the backup mode is continuously selected. The L2 switch 200 thus keeps the backup state as its working state as shown in FIG. 3.

The control module of the L2 switch 200 then sends the control frame signal to the L2 switch 100. The L2 switch 200 keeps the backup state as its working state, so that the control module of the L2 switch 200 sends the control frame signal with an entry of the backup state for the own working state and with an entry of the backup (master standby) state for the working state of the opposite device or the L2 switch 100.

The control module 110 of the L2 switch 100 set in the backup (master standby) state receives the control frame signal from the L2 switch 200 and extracts the working state of the opposite device or the L2 switch 200 from the received control frame signal. After confirmation that the extracted working state of the opposite device is the backup state, the control module 110 changes the working state of the L2 switch 100 to the master state as shown in FIG. 3.

The control module 110 subsequently sends the control frame signal to the L2 switch 200. The working state of the L2 switch 100 has been changed to the master state, so that the control module 110 of the L2 switch 100 sends the control frame signal with an entry of the master state for the own working state and with an entry of the backup state for the working state of the opposite device or the L2 switch 200.

According to the above series of operations, the L2 switch 100 out of the paired L2 switches 100 and 200 is set in the master mode, while the L2 switch 200 is set in the backup mode. The communication module of the L2 switch 200 set in the backup mode is under control of the communication module and blocks off the respective ports connecting with the L2 switches 300 through 600 and disconnects the physical lines linked to the L2 switches 300 through 600. The communication module of the L2 switch 200, however, continues transmission of the control frame signals to and from the L2 switch 100.

In the L2 switch 100 set in the master mode, on the other hand, the communication module 120 is under control of the control module 110 and opens the respective ports connecting with the L2 switches 300 through 600 and enables data transmission to and from the L2 switches 300 through 600 via the respective physical lines. The control module 110 outputs a switchover message, which shows that the L2 switch 100 is currently set in the master mode, to a management terminal (not shown) in the network. The network administrator reads the switchover message on a display unit of the management terminal and is thus notified of the fact that the L2 switch 100 is currently set in the master mode.

As described above, in the structure of the embodiment, the working state of the L2 switch 100 changes from the backup state to the master state via the backup (master standby) state as shown in FIG. 3. The L2 switch 100 accordingly changes its working state to the master state after confirmation that the working state of the pairing L2 switch 200 is the backup state. This arrangement effectively prevents both the paired L2 switches 100 and 200 from being simultaneously set in the master state (double master situation) and thereby restrains the occurrence of a loop in the network.

The following describes a transition of the working state in the L2 switch 100 of the embodiment set in the backup mode, in the case of failed transmission of the control frame signal from the L2 switch 200 set in the master mode.

Figure 5:
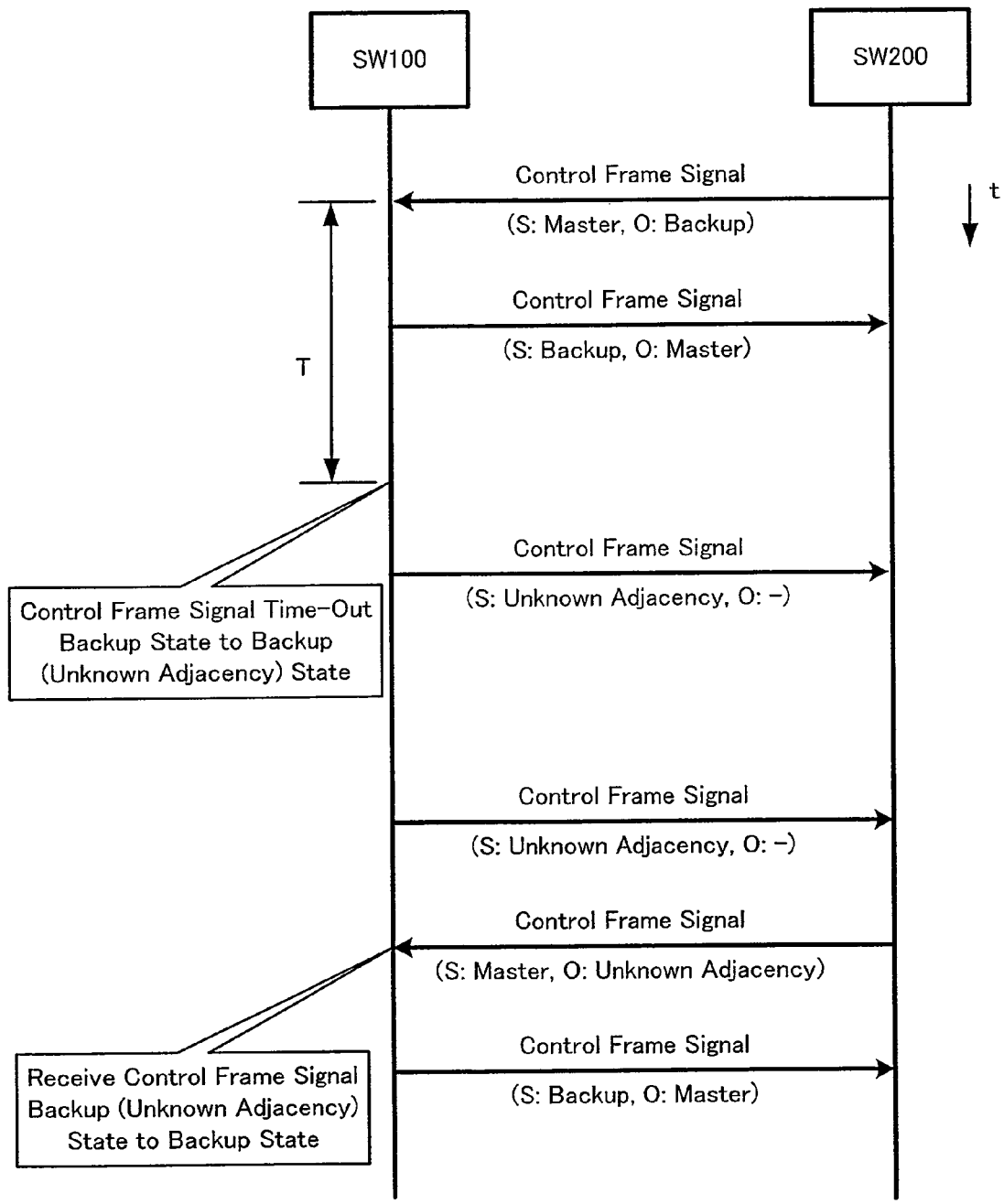
FIG. 5 shows a transition of the working state of the L2 switch 100 and transmission of control frame signals in the case of failed reception of the control frame signal.

FIG. 5 shows a transition of the working state of the L2 switch 100 and transmission of control frame signals in the case of failed reception of the control frame signal.

In this illustrated example, the L2 switch 100 is set in the backup mode and the L2 switch 200 is set in the master mode, unlike the above description. In the normal conditions, the L2 switch 100 and the L2 switch 200 send and receive the control frame signals to and from each other at regular intervals for mutual confirmation of the effective presence and the working state.

When the control packet process or the CPU is busy in the control module of the L2 switch 200 set in the master mode, the control module may fail to send the control frame signal to the L2 switch 100 set in the backup mode. The communication module generally carries out the hardware processing and thus attains normal transfer of packets even in the busy status of the control packet process or the CPU.

In the case of failed transmission of the control frame signal from the L2 switch 200 set in the master mode, the control module 110 of the L2 switch 100 set in the backup mode fails to receive the control frame signal from the L2 switch 200 in the preset time period T as shown in FIG. 5. The control module 110 of the L2 switch 100 changes the working state of the L2 switch 100 from the backup state to the backup (unknown adjacency) state in response to the control frame signal time-out as shown in FIG. 3. On the change of the working state to the backup (unknown adjacency) state, the control module 110 outputs an alarm message to the management terminal (not shown) in the network.

In this case, the failed transmission of the control frame signal is ascribed to the busy status of the control packet process or the CPU in the control module. In response to cancellation of the busy status, the control module of the L2 switch 200 set in the master mode immediately resumes transmission of the control frame signal to the L2 switch 100 set in the backup state.

The control module 110 of the L2 switch 100 set in the backup mode thus resumes reception of the control frame signal as shown in FIG. 5. The control module 110 selects either the master mode or the backup mode, based on the received control frame signal. Unless there is any variation in number of effective ports or another affecting piece of information, the backup mode is continuously selected. The control module 110 thus changes the working state of the L2 switch 100 from the backup (unknown adjacency) state to the backup state as shown in FIG. 3. This restores the normal operations as shown in FIG. 5.

In the case of any variation in number of effective ports, the control module 110 selects the master mode and changes the working state of the L2 switch 100 from the backup (unknown adjacency) state to the backup (master standby) state. After confirmation that the working state of the L2 switch 200 is the backup state, the L2 switch 100 changes its working state to the master state, as described previously.

As described above, when the control module of the L2 switch 200 set in the master state fails to send the control frame signal due to the busy status of the control packet process or the CPU, the control module 110 of the L2 switch 100 set in the backup state naturally fails to receive the control frame signal in the preset time period T. The control module 110 changes the working state of the L2 switch 100 to the backup (unknown adjacency) state in response to the control frame signal time-out. Namely the L2 switch 100 does not immediately change its working state to the master state. When the control module of the L2 switch 200 resumes transmission of the control frame signal in response to cancellation of the busy status, the control module 110 of the L2 switch 100 resumes reception of the control frame signal and selects either the master mode or the backup mode. The working state is changed to the backup (master standby) state in response to selection of the master mode, while being changed to the backup state in response to selection of the backup mode. In this case, the arrangement of the embodiment thus effectively prevents the double master situation.

Figure 6:
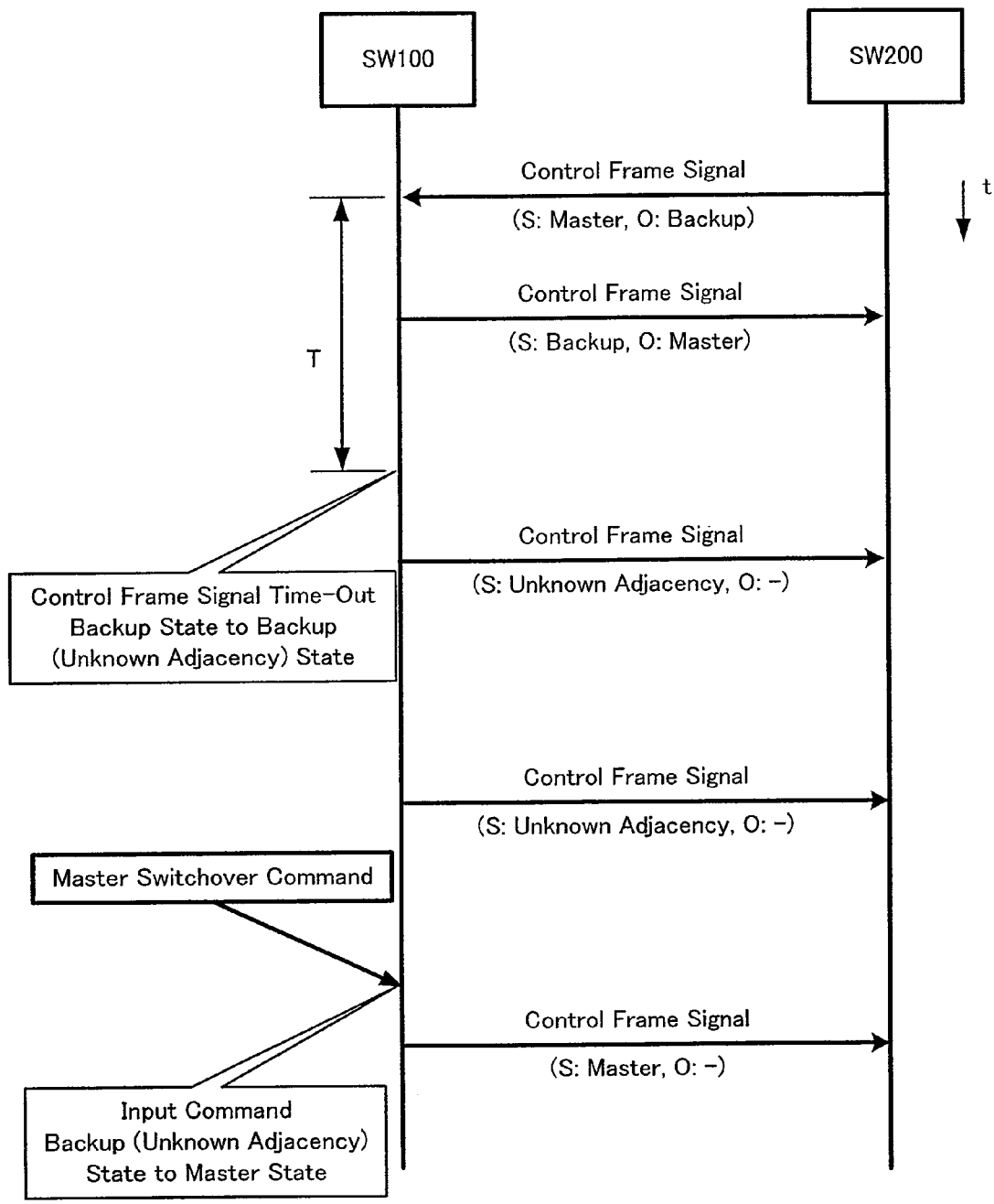
FIG. 6 shows a transition of the working state of the L2 switch 100 and transmission of control frame signals in the case of failed reception of the control frame signal.
Figure 7:
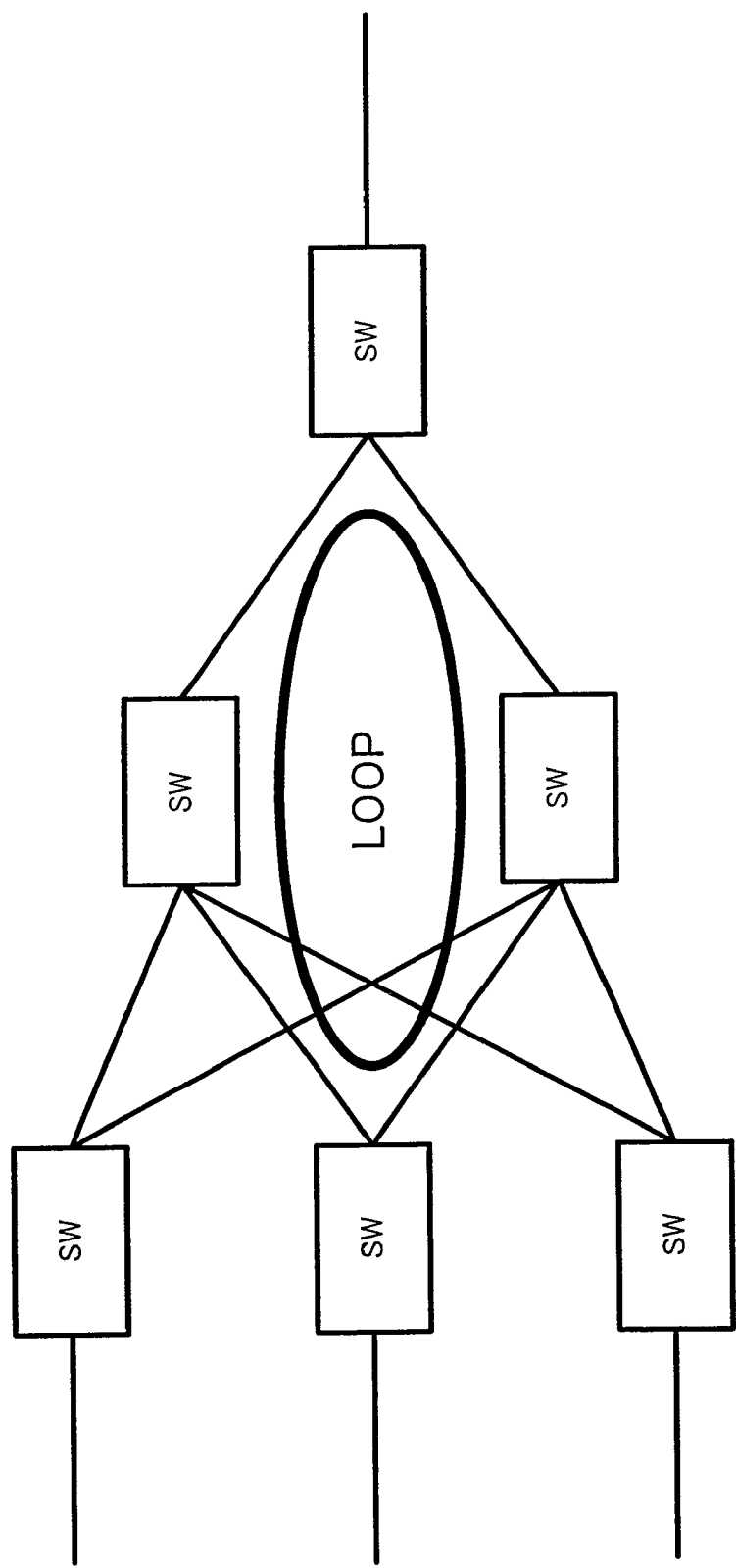
FIG. 7 shows occurrence of a loop in a network.
Figure 8:
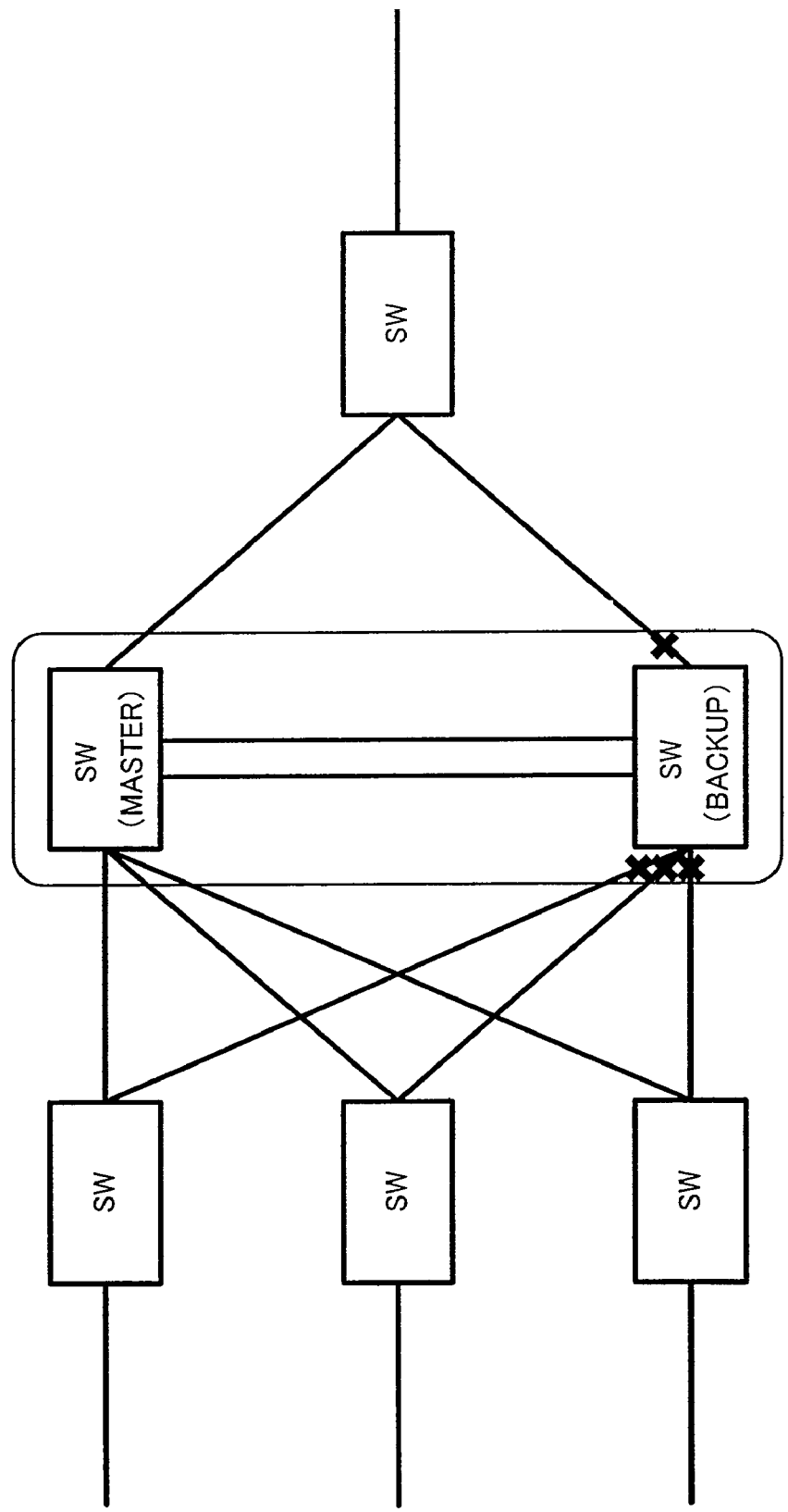
FIG. 8 shows paired L2 switches.

FIG. 6 shows a transition of the working state of the L2 switch 100 and transmission of control frame signals in the case of failed reception of the control frame signal, as in the case of FIG. 5.

In this illustrated example, the L2 switch 100 is set in the backup mode and the L2 switch 200 is set in the master mode.

In the case of occurrence of any trouble or failure in the L2 switch 200 set in the master mode, the control module of the L2 switch 200 fails to send the control frame signal to the L2 switch 100 set in the backup mode.

In the case of failed transmission of the control frame signal from the L2 switch 200 set in the master mode, the control module 110 of the L2 switch 100 set in the backup mode fails to receive the control frame signal from the L2 switch 200 in the preset time period T as shown in FIG. 6. As in the illustrated example of FIG. 5, the control module 110 of the L2 switch 100 changes the working state of the L2 switch 100 from the backup state to the backup (unknown adjacency) state in response to the control frame signal time-out. On the change of the working state to the backup (unknown adjacency) state, the control module 110 outputs an alarm message to the management terminal (not shown) in the network.

The network administrator reads the alarm message on the display unit of the management terminal and is notified of the fact that the L2 switch 100 fails to receive the control frame signal from the L2 switch 200 due to some reason.

In this case, the failed transmission of the control frame signal is ascribed to the occurrence of some trouble or failure in the L2 switch 200. Until fixation of the trouble or replacement of the failed part, no control frame signal is transmitted from the L2 switch 200 set in the master mode to the L2 switch 100 set in the backup mode.

When the alarm message is not cancelled even after some time, the network administrator manipulates the management terminal and outputs a master switchover command to switch over the working state to the master state to the L2 switch 100 via the network. The control module 110 of the L2 switch 100 receives the master switchover command and changes the working state of the L2 switch 100 directly from the backup (unknown adjacency) state to the master state.

The L2 switch 100 thus switches over the selection from the backup mode to the master mode. The communication module 120 accordingly opens the respective ports connecting with the L2 switches 300 through 600 and enables data transmission to and from the L2 switches 300 through 600 via the physical lines.

The master switchover command is equivalent to the transition instruction to the master state in the invention.

As described above, in the event of failed transmission of the control frame signal due to the occurrence of any trouble or failure in the L2 switch 200 set in the master mode, the control module 110 of the L2 switch 100 set in the backup mode changes the working state of the L2 switch 100 to the backup (unknown adjacency) state after elapse of the preset time period T. In the case of the occurrence of some trouble or failure, it is expected that failed reception of the control frame signal from the L2 switch 200 continues. The working state is directly changed to the master state, in response to input of the master switchover command by the network administrator. The L2 switch 100 thus takes over the master mode in place of the failed L2 switch 200. This attains a changeover from the active system to the standby system in the network and thereby ensures the redundancy of the network.

In the above example, in the event of failed transmission of the control frame signal from the L2 switch 200 for the preset time period T, the control module 110 of the L2 switch 100 changes the working state of the L2 switch 100 from the backup state to the backup (unknown adjacency) state. The similar series of operations is applicable to the L2 switch 100 in the backup (master standby) state. In the event of failed transmission of the control frame signal from the L2 switch 200 for the preset time period T, the control module 110 of the L2 switch 100 changes the working state of the L2 switch 100 from the backup (master standby) state to the backup (unknown adjacency) state as shown in FIG. 3. The subsequent series of operations are identical with those in the case of the transition from the backup state to the backup (unknown adjacency) state.

D. Modifications

The embodiment discussed above is to be considered in all aspects as illustrative and not restrictive. There may be many modifications, changes, and alterations without departing from the scope or spirit of the main characteristics of the present invention.

The technique of the invention is applicable to a virtual LAN established in the network. In the virtual LAN system, while sending and receiving the control frame signals to and from the pairing L2 switch 200, the control module 110 of the L2 switch 100 compares the respective numbers of effective ports or priority values in each group of a single virtual LAN or multiple virtual LANs to select either the master mode or the backup mode and manages the working state in each group as shown in FIG. 3. The communication module 120 opens and blocks off the respective ports in each group under control of the control module 110. The L2 switch 100 may be set in the master mode and the L2 switch 200 may be set in the backup mode in one group, while the L2 switch 100 is set in the backup mode and the L2 switch 200 is set in the master mode in another group.

Such management and control are carried out for each group of a single virtual LAN or multiple virtual LANs. This effectively prevents the double-master situation in each group and restrains the occurrence of a loop in each virtual LAN.

The above embodiment regards the application of the invention to the L2 switch as one of the network relay devices. The technique of the invention is, however, not restricted to the L2 switches at all but is applicable to diversity of other network relay devices.

Finally, the present application claims the priority based on Japanese Patent Application No. 2004-172451 filed on Jun. 10, 2004, which is herein incorporated by reference.

What is claimed is:

1. A network relay device that pairs with a specific network device to relay data in a network, the network relay device comprising:
   a control module that sends and receives control frame signals regularly to and from the specific network device, selects either of a master mode and a backup mode based on the control frame signals sent from the specific network device, and changes a working state according to a result of the selection; and
   a communication module that is under control of the control module to open a port and enable data transmission via a line linked to the port in the case of setting a master state to the working state, and to block off the port and disconnect the line linked to the port in the case of setting a backup state or another non-master state to the working state,
   the control module changing the working state among a first intermediate state, a second intermediate state, the backup state and the master state,
   wherein the first intermediate state is a working state to wait for a notification of a working state from the specific network device and to which the working state is transitioned when changing the working state from the backup state or the second intermediate state to the master state, and
   wherein the second intermediate state is a working state to wait for reception of the control frame signal and to which the working status is transitioned when the control frame signal cannot be received in the first intermediate state or the backup state, and
   the control module changing the working state from the backup state to the second intermediate state in the event of failure to receive the control frame signal for a preset time period, then selecting the working state from either the master state or the backup state upon reception of the control frame signal, changing the working state from the second intermediate state to the first intermediate state, in the event of the master state being selected, and changing the working state from the second intermediate state to the backup state in the event of the backup state being selected,
   the control module changing the working state from the first intermediate state to the second intermediate state in the event of failure to receive the control frame signal for a preset time period, then confirming whether the specific network device is in the backup state based on the control frame signal upon reception of the control frame signal, in the event it is confirmed that the specific network device is in the backup state, changing the working state from the first intermediate state to the master state, and
   the control module changing the working state from the second intermediate state to the master state, in response to an externally given transition instruction to the master state.

2. A network relay device in accordance with claim 1, wherein the control module changes the working state from either of the backup state and the first intermediate state to the second intermediate state in the event of failed reception of the control frame signal from the specific network device for a preset time period,
   in the case of subsequent resuming reception of the first control frame signal from the specific network device, the control module selecting either of the master mode and the backup mode and changing the working state from the second intermediate state to the first intermediate state in response to selection of the master mode, while changing the working state from the second intermediate state to the backup state in response to selection of the backup mode.

3. A network relay device in accordance with claim 2, wherein the network includes a large number of virtual LANs, which are divided into multiple groups,
   the control module carries out selection of either of the master mode and the backup mode and management of the working state with regard to each of the multiple groups, and
   the communication module under control opens and blocks off the port with regard to each of the multiple groups.

4. A network relay device in accordance with claim 1, wherein the network includes a large number of virtual LANs, which are divided into multiple groups,
   the control module carries out selection of either of the master mode and the backup mode and management of the working state with regard to each of the multiple groups, and
   the communication module under control opens and blocks off the port with regard to each of the multiple groups.

5. A network relay device in accordance with claim 2, wherein the network includes a large number of virtual LANs, which are divided into multiple groups,
   the control module carries out selection of either of the master mode and the backup mode and management of the working state with regard to each of the multiple groups, and
   the communication module under control opens and blocks off the port with regard to each of the multiple groups.

6. A method of controlling a network relay device that makes a pair with a specific network device to relay data in a network, the control method comprising the steps of:
   (a) sending and receiving control frame signals regularly to and from the specific network device, selecting either of a master mode and a backup mode based on the control frame signals sent from the at least specific network device, and changing a working state according to a result of the selection; and (b) opening a port and enabling data transmission via a line linked to the port in the case of setting a master state to the working state, while blocking off the port and disconnecting the line linked to the port in the case of setting a backup state or another non-master state to the working state, wherein the step (a) comprises the steps of:

(a-1) changing the working state among a first intermediate state, a second intermediate state, the backup state and the master state, wherein the first intermediate state is a working state for waiting for notification of a working state from the specific network device and to which the working state is transitioned when changing the working state from the backup state or the second intermediate state to the master state, and wherein the second intermediate state is a working state for waiting for reception of the control frame signal and to which the working status is transitioned when the control frame signal cannot be received in the first intermediate state or the backup state, and wherein the working state from the backup state is changed to the second intermediate state in the event of failure to receive the control frame signal for a preset time period;

(a-2) selecting the working state from either the master state or the backup state upon reception of the control frame signal when the working state is in the second intermediate state, changing the working state from the second intermediate state to the first intermediate state, in the event of the master state being selected, changing the working state from the second intermediate state to the backup state in the event of the backup state being selected;

(a-3) changing the working state from the first intermediate state to the second intermediate state in the event of failure to receive the control frame signal for a preset time period, confirming whether the specific network device is in the backup state based on the control frame signal upon reception of the control frame signal;

(a-4) changing the working state from the first intermediate state to the master state in the event it is confirmed that the specific network device is in the backup state; and (a-5) changing the working state from the second intermediate state to the master state, in response to an externally given transition instruction to the master state.

7. A control method in accordance with claim 6, wherein the step (a) further comprises the steps of:

(a-6) changing the working state from either of the backup state and the first intermediate state to the second intermediate state in the event of failed reception of the control frame signal from the specific network device for a preset time period, and (a-7) in the case of subsequent resuming reception of the first control frame signal from the specific network device after the step (a-6), selecting either of the master mode and the backup mode and changing the working state from the second intermediate state to the first intermediate state in response to selection of the master mode, while changing the working state from the second intermediate state to the backup state in response to selection of the backup mode.

* * * * *